(12) United States Patent
Avila et al.

(10) Patent No.: US 10,092,016 B2
(45) Date of Patent: Oct. 9, 2018

(54) METHOD OF PREPARING AN OAT-CONTAINING DAIRY BEVERAGE

(75) Inventors: Cristina Avila, Purchase, NY (US); Laura Maria Pires Blasi, Sao Paulo (BR); Juan Carlos Fernandez, Distrito Federal (MX); Renee Hamaoui, Hartsdale, NY (US); Mayte Lee, Delray Beach, FL (US)

(73) Assignee: PepsiCo, Inc., Purchase, NY (US)

(*) Notice: Subject to any disclaimer, the term of this patent is extended or adjusted under 35 U.S.C. 154(b) by 0 days.

(21) Appl. No.: 13/547,733

(22) Filed: Jul. 12, 2012

(65) Prior Publication Data

US 2013/0017300 A1 Jan. 17, 2013

Related U.S. Application Data

(60) Provisional application No. 61/506,948, filed on Jul. 12, 2011.

(51) Int. Cl.
*A23C 9/156* (2006.01)
*A23C 9/154* (2006.01)

(52) U.S. Cl.
CPC .................... *A23C 9/1544* (2013.01)

(58) Field of Classification Search
USPC .................... 426/590, 622, 521, 524, 463
See application file for complete search history.

(56) References Cited

U.S. PATENT DOCUMENTS

| | | |
|---|---|---|
| 1,163,175 A | 12/1915 | Rullman |
| 1,384,894 A | 7/1921 | Horlick |
| 3,116,150 A | 12/1963 | Baker |
| 3,317,402 A | 5/1967 | Smith |
| 3,391,003 A | 7/1968 | Armstrong |
| 3,494,769 A | 2/1970 | Tressler |
| 3,579,352 A | 5/1971 | Bookwalter |
| 3,595,671 A | 7/1971 | Cooke |
| 3,732,109 A | 5/1973 | Poat |
| 3,851,085 A | 11/1974 | Rodgers |
| 3,869,558 A | 3/1975 | Hampton |
| 3,925,343 A | 12/1975 | Hampton |
| 3,950,543 A | 4/1976 | Buffa |
| 3,958,016 A | 5/1976 | Galle |
| 4,028,468 A * | 6/1977 | Hohner et al. ............ 426/436 |
| 4,038,427 A | 7/1977 | Martin |
| 4,167,584 A | 9/1979 | Nelson |

(Continued)

FOREIGN PATENT DOCUMENTS

| | | |
|---|---|---|
| AU | 1989045913 | 12/1989 |
| CA | 1045890 | 1/1979 |

(Continued)

OTHER PUBLICATIONS

Essentials of Food Science, Food Science Texts Series, 2008 Springer New York, Milk and Milk Products, pp. 237-269.*

(Continued)

*Primary Examiner* — Tamra L. Dicus

(74) *Attorney, Agent, or Firm* — Brandon V. Zuniga; James R. Gourley; Carstens & Cahoon, LLP

(57) ABSTRACT

A process for preparing an oat and milk beverage includes processing taking place under chilled conditions. Moreover, the oat product used in accordance with aspects of this invention is hydrolyzed oat flour.

22 Claims, 1 Drawing Sheet

*Unaseptic and Aseptic Homogenization can be done in same process or only one.

(56) References Cited

U.S. PATENT DOCUMENTS

| | | |
|---|---|---|
| 4,171,384 A | 10/1979 | Chwalek |
| 4,247,561 A | 1/1981 | Nelson |
| 4,259,358 A | 3/1981 | Duthie |
| 4,266,027 A | 5/1981 | Muller |
| 4,282,319 A | 8/1981 | Conrad |
| 4,330,625 A | 5/1982 | Miller |
| 4,377,602 A | 3/1983 | Conrad |
| 4,431,674 A | 2/1984 | Fulger |
| 4,435,429 A | 3/1984 | Burrows |
| 4,435,430 A | 3/1984 | Fulger |
| 4,439,460 A | 3/1984 | Tsau et al. |
| 4,500,558 A | 2/1985 | Fulger |
| 4,551,347 A | 11/1985 | Karwowski |
| 4,613,507 A | 9/1986 | Fulger et al. |
| 4,656,040 A | 4/1987 | Fulger |
| 4,668,519 A | 5/1987 | Dartey |
| 4,692,340 A | 9/1987 | Grutte |
| 4,710,386 A | 12/1987 | Fulger |
| 4,777,056 A | 10/1988 | Buhler |
| 4,834,988 A | 5/1989 | Karwowski |
| 4,864,989 A | 5/1989 | Bolles |
| 4,886,665 A | 12/1989 | Kovacs |
| 4,996,063 A | 2/1991 | Inglett |
| 4,999,208 A | 3/1991 | Wolfe |
| 5,021,248 A | 6/1991 | Stark |
| 5,106,634 A | 4/1992 | Thacker |
| 5,106,643 A | 4/1992 | Laufer |
| 5,145,698 A | 9/1992 | Cajigas |
| 5,234,704 A | 8/1993 | Devine |
| 5,320,856 A | 6/1994 | Veronesi |
| 5,334,407 A | 8/1994 | Donnelly |
| 5,385,746 A | 1/1995 | De Almeida |
| 5,395,623 A | 3/1995 | Kovach |
| 5,407,694 A | 4/1995 | Devine |
| 5,458,893 A * | 10/1995 | Smith .................. A21D 2/36 426/18 |
| 5,476,675 A | 12/1995 | Lou |
| 5,490,997 A | 2/1996 | Devine |
| 5,523,109 A | 6/1996 | Hellweg |
| 5,554,402 A | 9/1996 | Smith |
| 5,571,334 A | 11/1996 | Dunn et al. |
| 5,656,317 A | 8/1997 | Smits |
| 5,686,123 A | 11/1997 | Lindahl |
| 5,744,187 A | 4/1998 | Gaynor |
| 5,846,786 A | 12/1998 | Senkeleski |
| 5,849,090 A | 12/1998 | Haralampu et al. |
| 5,863,590 A | 1/1999 | Alan |
| 5,888,548 A | 3/1999 | Wongsuragrai |
| 5,912,031 A | 6/1999 | Fitchett |
| 5,932,264 A | 8/1999 | Hurd |
| 5,981,237 A | 11/1999 | Meagher |
| 5,985,339 A | 11/1999 | Kamarei |
| 5,997,917 A | 12/1999 | Uchida et al. |
| 6,013,289 A | 1/2000 | Blank |
| 6,054,302 A | 4/2000 | Shi |
| 6,135,015 A | 10/2000 | Mendez |
| 6,168,821 B1 | 1/2001 | Castleberry |
| 6,190,708 B1 | 2/2001 | Triantafyllou |
| 6,210,722 B1 | 4/2001 | Wullschleger |
| 6,210,738 B1 | 4/2001 | Chen |
| 6,210,741 B1 | 4/2001 | Van Lengerich |
| 6,221,406 B1 | 4/2001 | Meschonat |
| 6,244,528 B1 | 6/2001 | Wallis |
| 6,287,621 B1 | 9/2001 | Lacourse |
| 6,287,626 B1 | 9/2001 | Fox |
| 6,451,369 B1 | 9/2002 | Triantafyllou |
| 6,482,459 B1 | 11/2002 | Anderson |
| 6,551,366 B1 | 4/2003 | D'Souza |
| 6,592,914 B1 | 7/2003 | Triantafyllou |
| 6,610,349 B1 | 8/2003 | Delrue et al. |
| 6,617,446 B1 * | 9/2003 | Papadopoulos ....... A23L 1/0522 536/102 |
| 6,685,974 B2 | 2/2004 | Whalen |
| 6,720,022 B1 | 4/2004 | Arnaut |
| 6,723,358 B1 | 4/2004 | Van Lengerich |
| 6,759,077 B1 | 7/2004 | Lewis |
| 6,797,307 B2 | 9/2004 | Malkki et al. |
| 7,030,092 B1 | 4/2006 | Levine |
| 7,160,564 B2 * | 1/2007 | Triantafyllou Oste ...................... A23C 11/10 426/52 |
| 7,244,457 B2 | 7/2007 | Racicot |
| 7,419,694 B2 | 9/2008 | Korolchuk |
| 7,754,270 B2 | 7/2010 | Wuersch |
| 7,794,774 B2 * | 9/2010 | Foster .................. A23L 1/0067 426/106 |
| 8,241,696 B2 | 8/2012 | Chung |
| 8,518,469 B2 | 8/2013 | MacDonald |
| 8,574,644 B2 | 11/2013 | Chatel |
| 8,591,970 B2 | 11/2013 | Chatel |
| 8,742,095 B2 | 6/2014 | Lehtomaki |
| 9,149,060 B2 | 10/2015 | Chatel |
| 9,150,895 B2 | 10/2015 | Kurihara |
| 2001/0002269 A1 | 5/2001 | Zhao |
| 2001/0022986 A1 | 9/2001 | Girsh |
| 2002/0127319 A1 | 9/2002 | Gare |
| 2002/0187224 A1 | 12/2002 | Haefliger |
| 2003/0170362 A1 | 9/2003 | Manning |
| 2004/0028797 A1 | 2/2004 | Squire |
| 2004/0140584 A1 | 7/2004 | Wang |
| 2004/0151805 A1 | 8/2004 | Gao et al. |
| 2004/0258829 A1 | 12/2004 | Zheng |
| 2005/0064080 A1 | 3/2005 | Creighton |
| 2005/0089602 A1 | 4/2005 | Kvist et al. |
| 2005/0106216 A1 | 5/2005 | Maurer et al. |
| 2005/0181114 A1 | 8/2005 | Bruemmer |
| 2005/0191400 A1 | 9/2005 | Satyavolu et al. |
| 2005/0214347 A1 | 9/2005 | Astrup et al. |
| 2005/0238777 A1 | 10/2005 | Klingeberg et al. |
| 2005/0244563 A1 | 11/2005 | Cavalieri et al. |
| 2005/0260305 A1 | 11/2005 | Adele et al. |
| 2006/0008574 A1 | 1/2006 | Begli et al. |
| 2006/0013940 A1 | 1/2006 | Mueller |
| 2006/0093720 A1 | 5/2006 | Tatz |
| 2006/0115573 A1 | 6/2006 | Singer et al. |
| 2006/0121174 A1 | 6/2006 | Franke |
| 2006/0134299 A1 | 6/2006 | Lahteenmaki |
| 2006/0141097 A1 | 6/2006 | Guo |
| 2006/0240148 A1 | 10/2006 | Nguyen et al. |
| 2006/0251791 A1 | 11/2006 | Rubio |
| 2006/0257548 A1 | 11/2006 | Crofskey |
| 2006/0280838 A1 | 12/2006 | Kvist |
| 2006/0286269 A1 | 12/2006 | Shah |
| 2007/0014892 A1 | 1/2007 | Mitchell |
| 2007/0026105 A1 | 2/2007 | Seo |
| 2007/0059340 A1 | 3/2007 | Bello |
| 2007/0104854 A1 * | 5/2007 | Foster .................. A23P 20/20 426/620 |
| 2007/0141218 A1 | 6/2007 | Chatel |
| 2007/0172568 A1 * | 7/2007 | Spelman .............. A23C 9/1522 426/590 |
| 2007/0178199 A1 | 8/2007 | Minor |
| 2007/0184175 A1 | 8/2007 | Rubio |
| 2007/0212472 A1 | 9/2007 | Hoelstein |
| 2007/0243301 A1 | 10/2007 | Barnett |
| 2007/0264400 A1 | 11/2007 | Milne |
| 2007/0292583 A1 | 12/2007 | Haynes |
| 2008/0003340 A1 | 1/2008 | Karwowski |
| 2008/0008801 A1 | 1/2008 | Bamekow |
| 2008/0131582 A1 | 6/2008 | Karwowski |
| 2008/0171114 A1 | 7/2008 | Castillo Rodriguez |
| 2008/0260909 A1 * | 10/2008 | Chung .................. A23C 9/1544 426/72 |
| 2008/0305212 A1 * | 12/2008 | Wong .................. A23C 9/1526 426/72 |
| 2009/0053771 A1 | 2/2009 | Dale |
| 2009/0148562 A1 | 6/2009 | Lin |
| 2009/0181128 A1 | 7/2009 | Blumenthal |
| 2009/0311376 A1 | 12/2009 | Rao |
| 2010/0104718 A1 | 4/2010 | Durand |
| 2010/0112127 A1 | 5/2010 | Chatel |
| 2010/0112167 A1 | 5/2010 | Chatel |

(56) References Cited

U.S. PATENT DOCUMENTS

| | | | |
|---|---|---|---|
| 2010/0316765 A1* | 12/2010 | French | A21D 6/006 426/28 |
| 2011/0020523 A1* | 1/2011 | Pereyra et al. | 426/580 |
| 2012/0082740 A1 | 4/2012 | Collins | |
| 2012/0245111 A1 | 9/2012 | Hoebler | |
| 2013/0183405 A1 | 7/2013 | Chatel | |
| 2013/0209610 A1 | 8/2013 | Carder | |
| 2013/0170362 A1 | 9/2013 | Manning | |
| 2013/0323799 A1 | 12/2013 | Takaha | |
| 2014/0017356 A1 | 1/2014 | Te Biesebeke | |
| 2014/0050819 A1 | 2/2014 | Chatel | |
| 2014/0193563 A1 | 7/2014 | Carder | |
| 2014/0193564 A1 | 7/2014 | Carder | |
| 2015/0183821 A1 | 7/2015 | Konstantinov | |
| 2015/0191758 A1 | 7/2015 | Larsen | |
| 2015/0351432 A1 | 12/2015 | Triantafyllou | |
| 2016/0185641 A1 | 6/2016 | Zuback | |

FOREIGN PATENT DOCUMENTS

| | | |
|---|---|---|
| CN | 1386446 | 12/2002 |
| CN | 101711109 A | 5/2010 |
| DE | 970141 | 8/1958 |
| EP | 0078782 | 5/1983 |
| EP | 0231729 | 8/1987 |
| EP | 0512249 | 11/1992 |
| EP | 0634106 | 1/1995 |
| EP | 0474230 | 3/1995 |
| EP | 2289343 | 3/2011 |
| FR | 2620906 | 3/1989 |
| GB | 1168692 | 10/1969 |
| JP | S63116657 | 5/1988 |
| JP | 2000004852 | 1/2000 |
| JP | 2002171920 | 6/2002 |
| RU | 2237419 | 10/2004 |
| TW | 58246 | 5/1984 |
| WO | 9210106 | 6/1992 |
| WO | 1993000826 | 1/1993 |
| WO | 9604799 | 2/1996 |
| WO | 2000030457 | 6/2000 |
| WO | 2003011052 | 2/2003 |
| WO | 2003090557 | 11/2003 |
| WO | 2006009169 | 1/2006 |
| WO | 2007020059 | 2/2007 |
| WO | 2008028994 | 3/2008 |
| WO | 2008096044 | 8/2008 |
| WO | 2008130914 A1 | 10/2008 |
| WO | 2009077659 | 6/2009 |
| WO | 2009109703 | 9/2009 |
| WO | 2009127687 | 10/2009 |
| WO | 2009158588 | 12/2009 |

OTHER PUBLICATIONS http://foodreference.about.com/od/Dairy/a/Why-Does-Milk-Curdle.htm , pp. 1-2.*

The Effect of Cold on Micro-Organisms in Relation to Dairying, by J. G. Davis, Express Dairy Co. (London), Ltd., Proceedings of the Society for Applied Bacteriology, vol. 14, Issue 2, pp. 216-242, Oct. 1951.*

CN Application No. 201280043817.6 Office Action dated Dec. 2, 2014.

International Search Report and Written Opinion from related PCT/US2012/046450 dated Sep. 6, 2012.

Hoseney, R. Carl, "Principles of Cereal Science and Technology," 1986, American Association of Cereal Chemists, Inc., St. Paul Minnesota 55121, pp. 148-149 (4 pages).

Anderson, et al. "Gelatinazation of corn grits by roll cooking, extrusion cooking and steaming," Staerke 22:130-135.

Anonymous: "Ovsena nahradka mlieka," XP002561727, URL:http://web.archive.org/web/20084200751/http://www.aspsk.sk/ovsene_mlieko.htm>, retrieved from the internet on Dec. 18, 2009, pp. 1-1, dated Apr. 20, 2008.

"Anonymous: ""Goldkill Instant Barley Drink"", XP002561728, URL:http:f/web.archive.org/web/20060303003347/goldkill.\ l com/ goldkili_instant.php>, retrieved from the Internet on Dec. 28, 2009, pp. 1-2, dated Mar. 3, 2006".

Brenda, The comprehensive Enzyme Information System, BC 3.2. 1.1.—alpha amylase; pp. 1 to 297; Retrieved from the internet: http://www.brenda-enzymes.info/php/result_flat.php4?ecno=3.2.1.1 &organism_list=,date unknown.

Changquing, et al, Study on the Extruding Production Method of Soluble Oats Fiber, vol. 28, No. 2, pp. 45-48, dated Mar. 20, 2002, with English Abstract.

Grenus, Food Product Design, Applications, Agglomerations, Jul. 10, 2014, Weeks Publishing Co., pp. 1-4, www.foodproductdesign.com/articles/2004/07/food-product-design-applications.

Gualberto, D.G. et al., Effect of extrusion processing on the soluble and insoluble fiber, and phytic acid contents of cereal brans, dated Sep. 28, 1997.

Gutkoski, L.C., et al., Effect of Extrusion Process Variables on Physical and Chemical Properties of Extruded Oat Products, Plant Foods for Human Nutrition, ® 2000 Kluwer Academic Publishers, pp. 315-325, dated Dec. 31, 1999.

Inglett, G.E. et al., Oat beta-glucan-amylodextrin: Preliminary preparations and biological properties, plant Fd. for Human Nutrition, vol. 45, pp. 53-61, dated Jun. 5, 2012.

Linko Y Y et al: The effect of HTST-extrusion on retention of cereal alpha-amylase activity and on enzymatic hydrolisis of barley starch, Food Processing Systems, Applied Science Publ, UK, Jan. 1, 1980 (Jan. 1, 1980), pp. Abstr, 4.2.25, 210-223, XP009127925, ISBN: 978-0-85334-896-2.

PCT Application No. PCT/US2008/060323 International Search Report and Written Opinion dated Aug. 13, 2008.

PCT Application No. PCT/US2009/060016 International Search Report dated Feb. 8, 2010.

PCT Application No. PCT/US2009/060016, International Preliminary Report on Patentability dated May 19, 2011.

PCT Application No. PCT/US2009/059916 International Search Report and Written Opinion dated Feb. 16, 2010.

PCT Application No. PCT/US2014/21913 International Search Report and Written Opinion dated Jun. 23, 2014.

PCT Application No. PCT/US2010/038506 International Search Report and Written Opinion dated Aug. 10, 2010.

PCT Application No. PCT/US2014/17288 International Search Report and Written Opinion dated Jun. 13, 2014.

PCT Application No. PCT/US2014/26367 International Search Report and Written Opinion dated Sep. 9, 2014.

Peter Koelln KGAA: Kochjule, Hafer-Getrank mit Fruchtsaft, XP002499645, Internet Citation, URL:http://www.koelin.de/downloads/37/Kochjule.pdf>, retrieved from the Internet on Oct. 14, 2008, pp. 1-19, dated Oct. 14, 2008.

Peter Kolin KGAA: Kolln Schmelzflocken Dinkel-Hafer, XP002499438, Internet Citation, URL:http:f/www.koelln.de/produkte/2/103/index.html>, retrieved from the Internet on Oct. 13, 2008, p. 1, dated Oct. 13, 2008.

Peter Kolin KGAA: KollnFlocken Instant, XP002499437, Internet Citation, URL:http:/fwww.koelln.de/produkte/1/15/index.html>, retrieved from the Internet on Oct. 13, 2008, p. 1, dated Oct. 13, 2008.

Vasanthan et al., Dextrinization of Starch in Barley Flurs with Thermostable alpha-Amylase by Extrusion Cooking, vol. 53, No. 12, pp. 616-622, dated Dec. 1, 2001.

Wang, Ming-chun, et al, Extrusion Technology Applied in the Nutritional Health Foods, College of Food Engineering & Biologic Technology, Tianjin University of Science and Technology, Tianjin 300457, pp. 63-66, dated Aug. 1, 2007, with English Abstract.

The Whole Grains Council, What are the Health Benefits?, http://wholegrainscouncil.org/whole-grains-101/what-are-the-health-benefits, 2 pages.

Zhang Haodong, "Starch Article Technology," Jilin Science and Technology Press, Feb. 29, 2008.

"Camire, Mary Ellen, et al. ""Thermal Processing Effects on Dietary Fiber Composition and Hydration Capacity in Corn Meal, Oat Meal, and Potato Peels,"" Cereal Chemistry 68(6), pp. 645-647, vol. 68, No. 6, 1991 (3 pages).".

(56) References Cited

OTHER PUBLICATIONS

Likimani, T.A., "Extrusion Cooking of Corn/Soybean Mix in Presence of Thermostable a-Amylase", Journal of Food Science, vol. 56, No. 1, 1991, pp. 99-105 (7 pages).
"Singh, Narpinder, et al., ""A Comparison of Wheat Starch, Whole Wheat Meal and Oat Flour in the Extrusion Cooking Process,"" J. Food Engineering 34(1997) 15-32(18 pages)".
"Tapola, N., et al. ""Glycemic responses of oat brain products in type 2 diabetic patients,"" Nutrition, Metabolism & Cardiovascular Diseases (2005) 15, 255-261 (7 pages)".
"Vasanthan, et al. ""Dietary fiber profile of barley flour as affected by extrusion cooking,"" Food Chemistry 77 (2002) pp. 35-40 (6 pages).".

\* cited by examiner

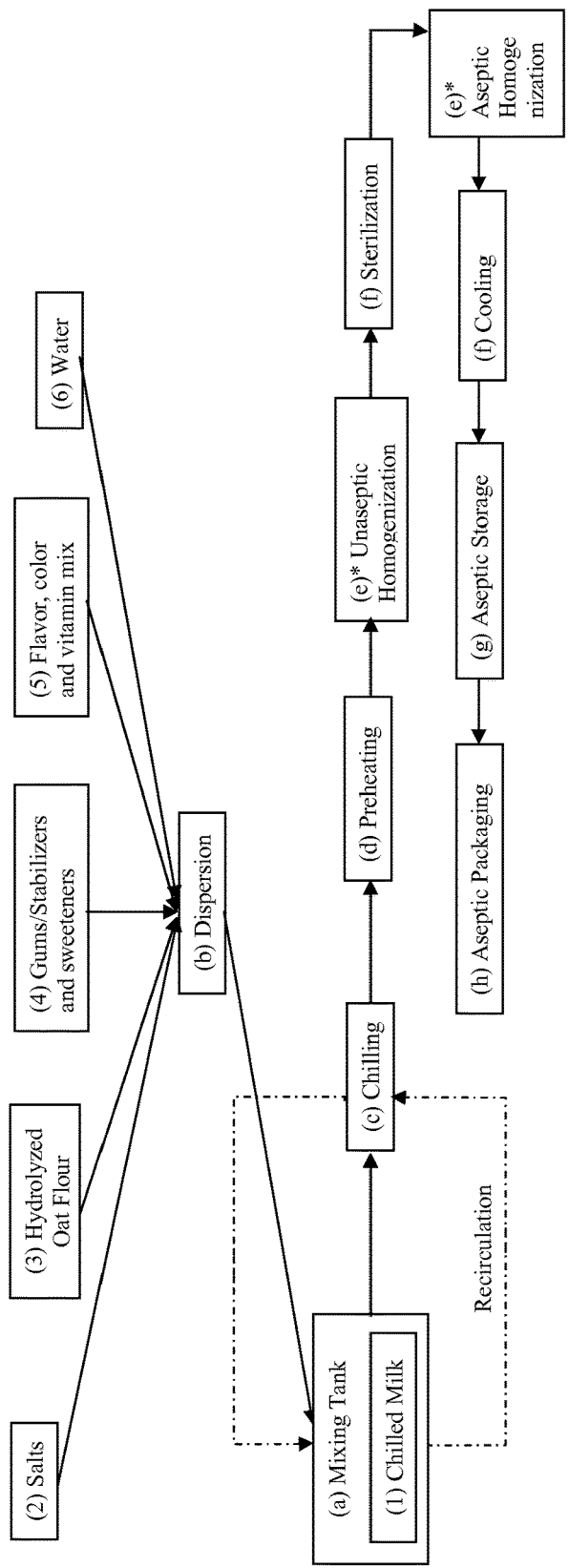

METHOD OF PREPARING AN OAT-CONTAINING DAIRY BEVERAGE

CROSS-REFERENCE TO RELATED APPLICATIONS

This application claims priority to U.S. Provisional Application No. 61/506,948, filed on Jul. 12, 2011, which is incorporated herein in its entirety.

FIELD OF THE INVENTION

The present invention relates to methods for preparing an oat-containing dairy beverage using a chilled processing system.

BACKGROUND OF THE INVENTION

In today's fast-paced society, it is easy to fall victim to consuming convenience foods that provide little, if any, nutrients such as vitamins, proteins, or fiber needed for added energy to get through the day. Of particular concern is a lack of easy and ready-to-eat healthy options for foods and beverages for consumption between meals or as meal replacement(s).

The food industry faces many challenges when attempting to make a healthy, ready-to-drink beverage. For example, fiber and other nutrients are often added to the beverage at the expense of the appearance, mouthfeel, and texture of the beverage, which negatively impacts consumer perception and acceptance of the beverage.

Furthermore, the processes used to make healthy nutrient-rich beverages are expensive and can be tedious and time-consuming as well. For instance, the costs associated with heating, mixing, sterilizing, and bottling the beverages can be cost prohibitive.

As such, a need exists in the food industry for an oat and milk beverage, and efficient process for making an oat and milk beverage, that delivers oats in an amount of up to a full serving of the whole grain dietary requirements to the individual and maintain a smooth texture and mouthfeel.

SUMMARY OF THE INVENTION

The present invention relates to an oat beverage and a method of preparing an oat and milk beverage via a chilled system. In certain aspects of the present invention, hydrolyzed oat flour is used.

BRIEF DESCRIPTION OF THE DRAWINGS

FIG. 1 illustrates one aspect of the invention whereby an oat-milk beverage is produced using fluid milk and a chilled system.

DETAILED DESCRIPTION OF THE PREFERRED EMBODIMENT(S)

The present invention is directed to an oat-containing dairy beverage with a smoothie-like texture and consistency. Although this invention contemplates any form of oat flour, it was discovered that hydrolyzed oat flour works particularly well. In certain aspects of the present invention, hydrolyzed oat flour is made in accordance with the processes described in U.S. patent application Ser. No. 12/264,404, corresponding U.S. publication no. 2010/0112167, 12/056,598, corresponding U.S. publication no. 2008/0260909, 12/814,610, corresponding U.S. publication no. 2010/0316765 and/or Ser. No. 12/264,399 corresponding U.S. publication no. 2010/0112127 which are expressly incorporated herein by reference in their entirety.

In particular, the product made in accordance with this invention is a milk product containing oat flour and other ingredients, such as natural or artificial flavors, sweeteners, natural or artificial colors, and containing at least 80% fresh fluid milk approved for human consumption.

Before the invention set forth herein, it was necessary in the food industry to heat a liquid in order to fully hydrate oat flour. Full hydration of oat flour is required to ensure that the product does not undergo further hydration during thermal processing. Full hydration also assists with the microbial stability and quality of the product. The present invention does not require heating to hydrate the oat flour in order to further process it.

In a typical industry accepted process, oat flour is hydrated with hot water during a long period of time, and subjected to milling to reduce particle size and viscosity. Then it is cooled, often mixed with a dry milk solution, sterilized, cooled, and packaged. The instant invention is beneficial as it eliminates several of these steps. For instance, the instant invention alleviates the need for milling equipment, speeds up the manufacturing process significantly (processing time is about 2 to 3 hours with non-hydrolyzed oat flour versus 30-50 minutes with cold process hydrolyzed oat flour as set forth herein, depending on batching size and equipment capacity), and saves energy by obviating the need for hydrating the flour via heating, then cooling (for microbial control), heating back up to sterilize, and subsequently cooling to package.

It was discovered that by using hydrolyzed oat flour, such as that described in U.S. patent application Ser. Nos. 12/264,404 and 12/264,399, heating was no longer necessary to fully hydrate the oat flour. This, in turn, presented an alternative and more cost and energy efficient means of producing an oat and milk beverage. For instance, since heating is not necessary, fluid milk (versus a dry milk powder mixed with water) may be used. Moreover, by virtue of this invention, higher amounts of oats can be added with hydrolyzed oat flour up to one serving without the need for ancillary equipment to reduce viscosity or particle size, thereby allowing a higher delivery of the healthy components found in oats, such as soluble fiber.

Turning to FIG. 1, in one aspect of the present invention, hydrolyzed oat flour (3) is directly introduced to buffered milk (1+2) in a mixing batching tank (a) via a disperser (b) to form a hydrolyzed oat flour slurry. Milk (1) is buffered with salts (2) to stabilize pH and milk proteins. Next, gums/stabilizers and sweeteners (4) are added to the hydrolyzed oat flour slurry. For instance, a premix of sugar and gum is introduced to the hydrolyzed oat flour slurry. This premix may be recirculated with the oat slurry or may be dissolved separately with water prior to its addition to the slurry, depending on stabilizer hydration requirements. Color and flavor and any vitamin mix (5) may then be added to the mixture. Following addition of the aforementioned ingredients, the hydrolyzed oat flour slurry is added to the raw chilled milk having a temperature of about 4-7° C. (1). The hydrolyzed oat flour mixture and chilled milk are mixed and a chilling system (c) is used to keep beverage at or under a temperature no higher than 10° C., such as 5° C. The mixing through the batching tank (a) is continuous, with sufficient agitation to keep the blend under suspension and without creating aeration. The chilled milk and hydrolyzed oat flour slurry will be referred to as the raw beverage. The raw beverage is then introduced to a homogenizer (e). Prior to homogenization, the raw beverage should be preheated (d) at a minimum temperature of 80° C. Any homogenizer may be used, such as a two-step stork homogenizer or Tetra Alex. Pressure parameters used in accordance with at least one aspect of the invention may be 200/30 bar. Next, the raw beverage is subjected to sterilization (f), such as UHT treatment. Finally, the product is cooled to a temperature no higher than about 35° C. and stored in aseptic tanks (g) until filled into containers (h).

Suitable salts include, but are not limited to, disodium phosphate, sodium citrate, sodium citrate and sodium chloride. Suitable sweeteners include nutritive and non-nutritive sweeteners such as sugar. Suitable stabilizers include gums such as gum Arabic, carageenan, pectin, agar, gellan, xanthan, and combinations thereof.

In the chilled system described above the temperature stays between about 4-10° C., such as about 4-7° C. The oat and milk beverage produced in accordance with this invention has a shelf life of about 6 months at about 25° C.

In an alternative aspect of the present invention, the hydrolyzed oat flour is hydrated with only ambient water or with premixed warm reconstituted milk. In this aspect of the invention, the process takes place at ambient temperatures (20-25° C.) or at 40-45° C., respectively, thereby requiring less stringent agitation. Milk powder is pre-hydrated in warm water (40-50° C.) and then combined with oat slurry or oat flour can be added into warm powder milk slurry and then cooled. It was found that even when dry milk or milk powder was used in combination with the hydrolyzed oat flour, that less heat is required when compared to the same process using universal/standard oat flour.

Typically milk will be present in an amount of 80-82% w/w and the hydrolyzed oat flour is present in an amount of 3-10% w/w, preferably 3.9-7.7% w/w. Other ingredients such as sugar, stabilizers, salts, flavors, and colors may be present in amounts effective for their purpose.

A non-limiting example of a beverage made in accordance with the present invention are as follows:

Example 1

| Ingredient | Amount (kg/18,000 L) |
| --- | --- |
| Hydrolyzed oat flour | 742 |
| Fluid milk (3 gm fat/L) | 15282 |
| Sugar | 1188 |
| Stabilizer (Gellan Gum) | 26 |
| Salt | 0.8 |
| Disodium phosphate | 9 |
| Sodium citrate | 2.4 |
| Potassium citrate | 6.6 |
| Lactovit Vitamin A + D | 0.1 |
| Filtered Water | 1862 |
| Vanilla Flavor | 55.7 |

Following UHT (sterilization) processing, the pH of the resulting beverage is 6.60-6.80. Further, the beverage has less than 185 kilocalories per portion (240 ml) if only sugar is used as sweetener. It should be noted that one of ordinary skill in the art would recognize that the Lactovit blend and/or blend of vitamins A and D as used in this example are optional. However, if the milk is skimmed and non-pasteurized, the fortification of the milk with vitamins A and D may be beneficial to bring the milk up to the standards of pasteurized milk.

Example 2

| Ingredient | % w/w |
| --- | --- |
| Milk | 80-82 |
| Hydrolyzed oat flour | 3.9-7.7 |
| Sugar | 6-7 |
| Stabilizer | 0.1-0.2 |
| Salts | 0.096-0.100 |
| Flavors | 0.03-0.05 |
| Colors | 0.01-0.02 |

Following UHT (sterilization) processing, the pH of the resulting beverages is 6.60-6.80.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for preparing an oat containing beverage comprising the steps of:
    a. hydrating hydrolyzed oat flour under chilled conditions;
    b. introducing the hydrolyzed oat flour to chilled fluid milk at a temperature of about 4-7° C. to form a raw beverage;
    c. preheating the raw beverage to 80° C. prior to homogenization, wherein the raw beverage is maintained at 4-7° C. until the beverage is preheated;
    d. homogenizing the raw beverage to form a final beverage; and
    e. introducing the final beverage to sterilization at a temperature of 140-145° C.

2. The method of claim 1 wherein the pH of the final beverage is 6.6-6.8.

3. The method of claim 1 wherein the viscosity of the final beverage is 50-110 cps at 25° C.

4. The method of claim 1 further comprising adding at least one ingredient selected from the group consisting of sweeteners, colors, flavors, salts, and stabilizers, to the hydrolyzed oat flour prior to introducing the hydrolyzed oat flour to the chilled milk.

5. The beverage prepared in accordance with the method of claim 1 whereby the beverage has a shelf life of 6 months at 25° C.

6. The method of claim 1, wherein steps a and b comprise:
    hydrating the hydrolyzed oat flour by introducing the hydrolyzed oat flour to the chilled fluid milk at a temperature of 4-7° C. for less than 2 hours to form the raw beverage.

7. The method of claim 1, wherein steps a and b comprise:
    hydrating the hydrolyzed oat flour by introducing the hydrolyzed oat flour to the chilled fluid milk at a temperature of 4-7° C. for no more than 1 hour to form the raw beverage.

8. The method of claim 1, wherein steps a and b comprise:
    hydrating the hydrolyzed oat flour by introducing the hydrolyzed oat flour to the chilled fluid milk at a temperature of 4-7° C. for no more than 50 minutes to form the raw beverage.

9. The method of claim 1, wherein steps a and b comprise:
hydrating the hydrolyzed oat flour by introducing the hydrolyzed oat flour to the chilled fluid milk at a temperature of 4-7° C. for no more than 30 minutes to form the raw beverage.

10. The method of claim 1, wherein steps a and b comprise:
hydrating the hydrolyzed oat flour by introducing the hydrolyzed oat flour to the chilled fluid milk at a temperature of 4-7° C. for 30 to 50 minutes to form the raw beverage.

11. The method of claim 1, wherein step a comprises:
fully hydrating the hydrolyzed oat flour under the chilled conditions.

12. The method of claim 1, wherein steps a and b comprise:
fully hydrating the hydrolyzed oat flour by introducing the hydrolyzed oat flour to the chilled fluid milk at a temperature of 4-7° C. for less than 2 hours to form the raw beverage.

13. The method of claim 1, wherein steps a and b comprise:
fully hydrating the hydrolyzed oat flour by introducing the hydrolyzed oat flour to the chilled fluid milk at a temperature of 4-7° C. for no more than 1 hour to form the raw beverage.

14. The method of claim 1, wherein steps a and b comprise:
fully hydrating the hydrolyzed oat flour by introducing the hydrolyzed oat flour to the chilled fluid milk at a temperature of 4-7° C. for no more than 50 minutes to form the raw beverage.

15. The method of claim 1, wherein steps a and b comprise:
fully hydrating the hydrolyzed oat flour by introducing the hydrolyzed oat flour to the chilled fluid milk at a temperature of 4-7° C. for no more than 30 minutes to form the raw beverage.

16. The method of claim 1, wherein steps a and b comprise:
fully hydrating the hydrolyzed oat flour by introducing the hydrolyzed oat flour to the chilled fluid milk at a temperature of 4-7° C. for 30 to 50 minutes to form the raw beverage.

17. The method of claim 1, wherein the hydrolyzed oat flour is whole grain oat flour.

18. The method of claim 17, wherein the hydrolyzed oat flour comprises hydrolyzed starch.

19. The method of claim 6, wherein the hydrolyzed oat flour is whole grain oat flour.

20. The method of claim 19, wherein the hydrolyzed oat flour comprises hydrolyzed starch.

21. The method of claim 16, wherein the hydrolyzed oat flour is whole grain oat flour.

22. The method of claim 21, wherein the hydrolyzed oat flour comprises hydrolyzed starch.

* * * * *